United States Patent
Chen et al.

(10) Patent No.: US 10,712,615 B2
(45) Date of Patent: Jul. 14, 2020

(54) DISPLAY SUBSTRATE, METHOD FOR FABRICATING THE SAME, DISPLAY PANEL AND DISPLAY DEVICE

(71) Applicants: BEIJING BOE DISPLAY TECHNOLOGY CO., LTD., Beijing (CN); BOE Technology Group Co., Ltd., Beijing (CN)

(72) Inventors: Dongchuan Chen, Beijing (CN); Xibin Shao, Beijing (CN); Yanping Liao, Beijing (CN); Zhenyu Zhang, Beijing (CN); Xueqiang Qian, Beijing (CN); Fangyu Wang, Beijing (CN)

(73) Assignees: BEIJING BOE DISPLAY TECHNOLOGY CO., LTD., Beijing (CN); BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 16/309,382

(22) PCT Filed: Mar. 30, 2018

(86) PCT No.: PCT/CN2018/081262
§ 371 (c)(1),
(2) Date: Dec. 12, 2018

(87) PCT Pub. No.: WO2018/228024
PCT Pub. Date: Dec. 20, 2018

(65) Prior Publication Data
US 2020/0081299 A1    Mar. 12, 2020

(30) Foreign Application Priority Data
Jun. 12, 2017 (CN) .......................... 2017 1 0441031

(51) Int. Cl.
*G02F 1/13357* (2006.01)
*G02F 1/1335* (2006.01)

(52) U.S. Cl.
CPC .. *G02F 1/133617* (2013.01); *G02F 1/133504* (2013.01); *G02F 1/133516* (2013.01)

(58) Field of Classification Search
None
See application file for complete search history.

(56) References Cited

U.S. PATENT DOCUMENTS

2003/0089252 A1* 5/2003 Sarnecki ............. H01L 51/0004
                                                                   101/170
2004/0119909 A1    6/2004 Chang et al.
(Continued)

FOREIGN PATENT DOCUMENTS

CN    101105617 A    1/2008
CN    101866642 A    10/2010
(Continued)

OTHER PUBLICATIONS

First Office Action with English language translation, CN Patent Application No. 201710441031.4, dated Nov. 5, 2018, 14 pp.
(Continued)

*Primary Examiner* — Ashok Patel
(74) *Attorney, Agent, or Firm* — Myers Bigel, P.A.

(57) ABSTRACT

Embodiments of the present disclosure provide a display substrate and a method for fabricating the same, a display panel and a display device. The display substrate includes a first photoluminescent layer, which is in a first sub-pixel region and configured to emit light of a first color under excitation of light of a second color, and a filter layer, which is in a second sub-pixel region and configured to filter out at least part of light of a different color other than the second color.

13 Claims, 3 Drawing Sheets

(56) References Cited

U.S. PATENT DOCUMENTS

2017/0102579 A1     4/2017  Wang
2017/0373859 A1*   12/2017  Shors ........................ G09C 5/00

FOREIGN PATENT DOCUMENTS

CN       203465442 U      3/2014
CN       104793392 A      7/2015
CN       106990614 A      7/2017
WO       2016/062248 A1   4/2016

OTHER PUBLICATIONS

International Search Report and Written Opinion of the International Searching Authority with English language translation, International Application No. PCT/CN2018/081262, dated Jun. 14, 2018, 14 pp.

* cited by examiner

| forming a first photoluminescent layer in a first sub-pixel region of the substrate, which emits light of the first color under excitation of light of the second color | — S10 |

| forming a filter layer in a second sub-pixel region of the substrate, which is used to filter out at least part of light of a color other than the second color | — S11 |

| forming a second photoluminescent layer in a third sub-pixel region of the substrate, which is configured to emit light of a third color under excitation of light of the second color | — S12 |

Fig. 9

DISPLAY SUBSTRATE, METHOD FOR FABRICATING THE SAME, DISPLAY PANEL AND DISPLAY DEVICE

CROSS REFERENCE TO RELATED APPLICATIONS

The present application is a 35 U.S.C. 371 national stage application of PCT International Application No. PCT/CN2018/081262, filed on Mar. 30, 2018, which claims the benefit of Chinese Patent Application No. 201710441031.4, filed on Jun. 12, 2017, the contents of which are incorporated herein by reference in their entireties.

TECHNICAL FIELD

The present disclosure relates to the field of display technologies, and particularly to a display substrate, a method for fabricating the same, a display panel and a display device.

BACKGROUND

Liquid Crystal Display (LCD) has the characteristics of small size, low power consumption, no radiation and the like, and occupies a dominant position in the current display market.

LCD comprises an array substrate and a color film substrate which are assembled together. In the color film substrate, a red sub-pixel region comprises a red photoresist, a green sub-pixel region comprises a green photoresist, and a blue sub-pixel region comprises a blue photoresist.

Non-red light of the white light emitted by a backlight module is absorbed and filtered out by the red photoresist, so that red light is emitted. Similarly, non-green light of the white light emitted by the backlight module is absorbed and filtered out by the green photoresist, so that green light is emitted. Non-blue light of the white light emitted by a backlight module is absorbed and filtered out by the blue photoresist, so that blue light is emitted. However, as a result of this design, most of the light emitted by the backlight module is absorbed, making the utilization rate of the backlight very low.

SUMMARY

In a first aspect, a display substrate is provided, comprising: a first photoluminescent layer, which is arranged in a first sub-pixel region and configured to emit light of a first color under excitation of light of a second color; and a filter layer, which is arranged in a second sub-pixel region and configured to filter out at least part of light of a color other than the second color.

In an exemplary embodiment, the first sub-pixel region is adjacent to the second sub-pixel region.

In an exemplary embodiment, the display substrate further comprises a second photoluminescent layer, which is arranged in a third sub-pixel region and emits light of the third color under excitation of light of the second color.

In an exemplary embodiment, the second sub-pixel region is adjacent to both the first sub-pixel region and the third sub-pixel region.

In an exemplary embodiment, one of the first color and the third color is red, the other one of the first color and the third color is green, and the second color is blue.

In an exemplary embodiment, the first photoluminescent layer and the second photoluminescent layer comprise quantum dots or fluorescent powder.

In an exemplary embodiment, the filter layer comprises a host material and a scattering material doped in the host material.

In an exemplary embodiment, the scattering material comprises at least one of $SiO_2$, $TiO_2$, $CaCO_3$ and a polymer.

In an exemplary embodiment, the scattering material in the filter layer has a mass percentage of 0.2%~10%.

In an exemplary embodiment, the scattering material in the filter layer has a mass percentage of 0.2%~2%.

In an exemplary embodiment, the host material comprises a photoresist composition.

In an exemplary embodiment, the photoresist composition comprises a dispersant, wherein the dispersant comprises at least one of polyurethane, polyacrylate, unsaturated polyamide, ammonium polycarboxylate salt, polysiloxane and sodium lauryl sulfate.

In a second aspect, a display panel is provided, comprising the display substrate according to the first aspect.

In a third aspect, a display device is provided, comprising the display panel according to the second aspect, and a backlight module configured to emit light of the second color.

In a fourth aspect, a method for fabricating the display substrate is provided, comprising: forming a first photoluminescent layer in a first sub-pixel region of a substrate, wherein the first photoluminescent layer is configured to emit light of a first color under excitation of light of a second color; and forming a filter layer in a second sub-pixel region of the substrate, wherein the filter layer is configured to filter out at least part of light of a color other than the second color.

In an exemplary embodiment, the method for fabricating the display substrate further comprises forming a second photoluminescent layer in a third sub-pixel region of the substrate, wherein the second photoluminescent layer is configured to emit light of a third color under excitation of light of the second color.

In an exemplary embodiment, the second sub-pixel region is adjacent to both the first sub-pixel region and the third sub-pixel region.

In an exemplary embodiment, the first photoluminescent layer, the filter layer and the second photoluminescent layer are formed by using a same mask.

BRIEF DESCRIPTION OF THE DRAWINGS

In order to more clearly illustrate the technical solutions in the embodiments of the present disclosure or in the prior art, the accompanying drawings required to be used in the description of the embodiments or the prior art will be briefly introduced below. Apparently, the accompanying drawings in the following description are merely some embodiments of the present disclosure, and for those skilled in the art, other accompanying drawings may also be obtained according to the accompanying drawings without creative effort.

EMBODIMENTS

The technical solutions of the embodiments of the present disclosure will be clearly and completely described hereinafter with reference to the accompanying drawings in the embodiments of the present disclosure. Apparently, the described embodiments are merely part of the embodiments of the present disclosure, rather than all embodiments. Based on the embodiments in the present disclosure, all other embodiments obtained by those skilled in the art without creative efforts are all within the protection scope of the present disclosure.

Reference numerals: 1—display substrate; 2—counter substrate; 3—liquid crystal layer; 4—backlight module; 5—array substrate; 10—first photoluminescent layer; 11—red photoluminescent layer; 20—filter layer; 21—blue filter layer; 201—scattering particles; 30—second photoluminescent layer; 31—green photoluminescent layer; 40—black matrix.

Embodiments of the present disclosure provide a display substrate, a method for fabricating the same, a display panel and a display device, which may increase utilization rate of the backlight and reduce crosstalk.

Figure 1:
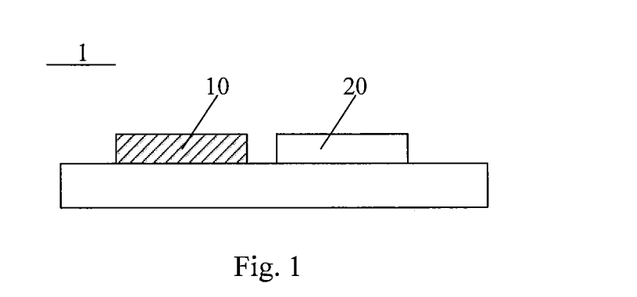
FIG. 1 is a schematic structural diagram of a display substrate according to an embodiment of the present disclosure.

Embodiments of the present disclosure provide a display substrate 1, as shown in FIG. 1, comprising: a first photoluminescent layer 10 arranged in a first sub-pixel region and configured to emit light of a first color under excitation of light of a second color; a filter layer 20 arranged in a second sub-pixel region and configured to filter out at least part of light of a color other than the second color.

When the display substrate 1 is applied to a display device, a backlight module emits light of the second color. When the light of the second color passes through the first photoluminescent layer 10, the first photoluminescent layer 10 is excited to emit light of the first color. When the light of the second color passes through the filter layer 20, the filter layer 20 filters out at least part of light of a color other than the second color, and substantially all of the light of the second color may be transmitted.

The light of the first color, which is emitted by the first photoluminescent layer 10 under excitation of the light of the second color, is uniformly emitted around. Namely, the light of the first color emitted by the first photoluminescent layer 10 is emitted not only to the light exit side of the display substrate 1, but also to the light entrance side of the display substrate 1, so that the light of the first color emitted to the light entrance side of the display substrate 1 is directed to the backlight module. Based on the structure of backlight module, even when the backlight module does not comprise a reflector sheet, the light of the first color directed to the backlight module is reflected again, due to the following reasons: the backlight module further comprising other film materials (comprising a light guide plate, an optical film and the like), no matter what material there being a reflection and only the intensity of reflection being different, and the light guide plate itself having a surface (the surface on which a non-optical lattice point is located) which is subjected to high reflection processing. Of course, when the backlight module comprises a reflector plate, the reflection to the light of the first color which is directed to the backlight module of the backlight module is stronger. When the light of the first color which is reflected again by the backlight module is directed to the second sub-pixel region, most or all of the light of the first color is filtered out by the filter layer 20 due to the filtering effect of filter layer 20.

It should be noted that, firstly, the display substrate 1 may be an array substrate, and in this case, the display substrate 1 further comprises a thin film transistor, a transparent electrode and the like. Of course, the display substrate 1 may also be a counter substrate, which is assembled with an array substrate to form a display panel.

Secondly, the principle for the filter layer 20 follows. The filter layer 20 partially or completely absorbs and filters out the light of a color other than the second color in the light incident thereon, while for the light of the second color in the incident light, substantially portion of the light transmits through the filter layer 20.

Thirdly, the first sub-pixel region and the second sub-pixel region are regions in each pixel in which different sub-pixels are located.

Embodiments of the present disclosure provide a display substrate 1, by arranging a first photoluminescent layer 10 in a first sub-pixel region and a filter layer 20 in a second sub-pixel region, when the display substrate is applied to a display device, a backlight module emits light of the second color. The utilization rate and transmissivity of backlight may be remarkably increased by utilizing the self-luminous characteristic of the first photoluminescent layer 10 excited by light of the second color and the characteristic that the filter layer 20 absorbs little light of the second color and is transmissive to substantially all of the light of the second color. On this basis, based on the absorption and filtering effect of the filter layer 20 on the light of the non-second color, even if the first photoluminescent layer 10 uniformly emits light of the first color around under excitation of light of the second color, a part of light of the first color may be directed to the backlight module, and incident into the second sub-pixel region after being reflected again by the backlight module, color crosstalk would not be caused in the second sub-pixel region.

If the first sub-pixel region and the second sub-pixel region are far apart, the filter layer 20 located in the second sub-pixel region would not well absorb and filter out light of the first color emitted by the first photoluminescent layer 10 and reflected by the backlight module. Therefore the first sub-pixel region is adjacent to the second sub-pixel region.

Figure 2:
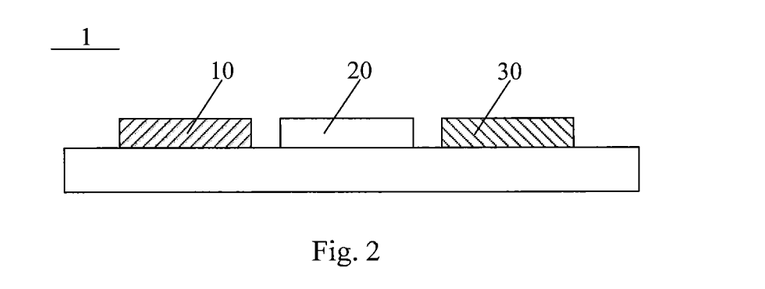
FIG. 2 is a schematic structural diagram of a display substrate according to an embodiment of the present disclosure.

For example, as shown in FIG. 2, the display substrate 1 further comprises a second photoluminescent layer 30 arranged in the third sub-pixel region. The second photoluminescent layer 30 emits light of the third color under excitation of light of the second color. The second sub-pixel region is adjacent to the first sub-pixel region and the third sub-pixel region.

In case the display substrate 1 is applied to a display device, the backlight module emits light of the second color. When the light of the second color passes through the first photoluminescent layer 10, the first photoluminescent layer 10 is excited to emit light of the first color. When the light of the second color passes through the second photoluminescent layer 30, the second photoluminescent layer 30 is excited to emit light of the third color. When the light of the second color passes through the filter layer 20, the filter layer 20 filters out at least part of light of a color other than the second color, and substantially all of the light of the second color may be transmitted. Thus, for the first sub-pixel region, the second sub-pixel region and the third sub-pixel region, the utilization rate and the transmissivity of the backlight may be remarkably increased.

On this basis, even if the first photoluminescent layer 10 and the second photoluminescent layer 30 uniformly emit light of the first color and light of the third color around respectively under excitation of light of the second color, and there is a part of the light of the first color and the light of the third color being directed to the backlight module and incident into the adjacent second sub-pixel region after being reflected again by the backlight module, color crosstalk would not be caused in the second sub-pixel region due to the filtering effect of the light filtering layer 20 (most or all of the light of the first color and the light of the third color may be filtered out by the filter layer 20). In addition, the light of the third color directed to the first photoluminescent layer 10 after being reflected again by the backlight module would not cause color crosstalk in the first sub-pixel region due to the blocking effect of the first photoluminescent layer 10; Similarly, the light of the first color directed to the second photoluminescent layer 30 after being reflected again by the backlight module would not cause color crosstalk in the third sub-pixel region due to the blocking effect of the second photoluminescent layer 30.

Figure 3:
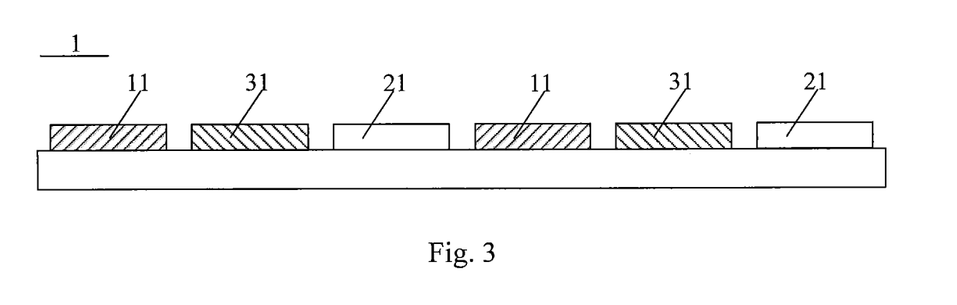
FIG. 3 is a schematic structural diagram of a display substrate according to an embodiment of the present disclosure.

Further, the first color and the third color are respectively red and green, and the second color is blue. Based on this, as shown in FIG. 3, the display substrate 1 comprises: a red photoluminescent layer 11 which is arranged in the first sub-pixel region and emits red light under the excitation of blue light; a green photoluminescent layer 31 which is arranged in the third sub-pixel region and emits green light under the excitation of blue light; and a blue filter layer 21 which is arranged in the second sub-pixel region and filter out at least part of light of a color other than blue.

On this basis, when the display substrate 1 is applied to a liquid crystal display device, the backlight module emits blue light. When the blue light passes through the red photoluminescent layer 11, the red photoluminescent layer 11 is excited to emit red light. When the blue light passes through the green photoluminescent layer 31, the green photoluminescent layer 31 is excited to emit green light. When the blue light passes through the blue filter layer 21, substantially all of the blue light may transmit. Therefore, under the modulation of the liquid crystal, the red, green and blue light is mixed on the light exit side of the liquid crystal display device to realize color display.

Based on the above, for example, the first photoluminescent layer 10 comprises quantum dots or fluorescent powder, and the second photoluminescent layer 30 comprises quantum dots or fluorescent powder.

Specifically, when the first photoluminescent layer 10 comprises fluorescent powder, and the first photoluminescent layer 10 emits red light under excitation of blue light, the material of the first photoluminescent layer 10 may comprise $Y_2O_3$:Ru. When the second photoluminescent layer 30 comprises fluorescent powder, and the second photoluminescent layer 30 emits green light under excitation of blue light, the material of the second photoluminescent layer 30 may comprise $SrGa_2S_4$.

When the first photoluminescent layer 10 comprises quantum dots, and the first photoluminescent layer 10 emits red light under excitation of blue light, the material of the first photoluminescent layer 10 may comprise at least one of cadmium sulfide (CdS), cadmium selenide (CdSe), zinc sulfide (ZnS) and zinc selenide (ZnSe). When the second photoluminescent layer 30 comprises quantum dots, and the second photoluminescent layer 30 emits green light under excitation of blue light, the material of the second photoluminescent layer 30 may comprise at least one of CdS, CdSe, ZnS and ZnSe. The color may be adjusted by the diameter of the quantum dot material. Therefore, the first photoluminescent layer 10 and the second photoluminescent layer 30 may be made of the same materials.

For example, the filter layer 20 comprises a host material and a scattering material doped in the host material.

Figure 4:
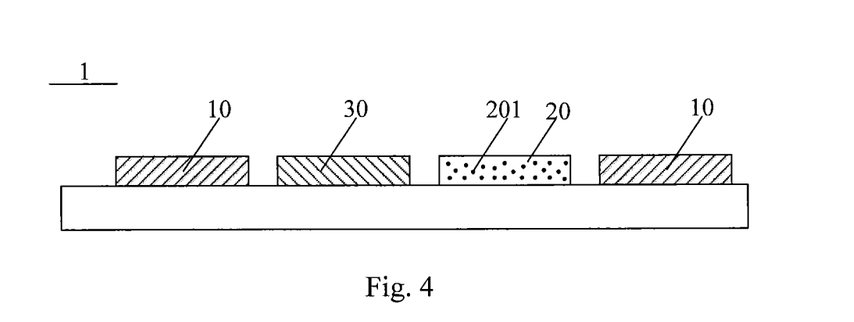
FIG. 4 is a schematic structural diagram of a display substrate according to an embodiment of the present disclosure.

As shown in FIG. 4, the scattering material can be scattering particles 201.

Since the first photoluminescent layer 10 and the second photoluminescent layer 30 uniformly emit light of the first color and light of the third color around respectively under excitation of light of the second color, the light intensity distribution is very uniform. In contrast, the directivity of the light of the second color emitted by the backlight module is increased (i.e., the angle range of the light of the second color is decreased). Therefore, when the display substrate 1 is applied to a display device, color shift may occur at a large angle (when the light of the second color is blue light, the blue light is yellowish due to low intensity at a large angle), since that intensity of the light of the second color emitted by the second sub-pixel is low. Based on this, the light of the second color emitted by the backlight module may be scattered in all directions by doping the scattering material into the filter layer 20. This increases the uniformity of the light emitted by the second sub-pixel at various angles, thereby improving the color shift problem at large angles.

For example, the scattering material may comprise at least one of the scattering particles 201, such as silicon dioxide ($SiO_2$), titanium dioxide ($TiO_2$), calcium carbonate ($CaCO_3$), and may also comprise polymer. In this way, the influence of the scattering material on the light transmissivity may be reduced as much as possible.

For example, the scattering material in the filter layer 20 has a mass percentage of 0.2%~10%. On the basis that the scattering material functions as scattering light, the influence of the scattering material on the light transmissivity may be reduced as much as possible.

For example, the scattering material in the filter layer 20 has a mass percentage of 0.2%~2%.

For example, the host material comprises a photoresist composition. Namely, a material which may be applied to a color film of a conventional liquid crystal display device is adopted as a host material of the filter layer 20. The technology is more mature and the cost is lower.

The main component of the photoresist composition comprises alkali-soluble resin, photoactive compound, photoinitiator, pigment dispersion and organic solvent. The pigment dispersion may comprise second color pigment, dispersant and organic solvent. The dispersant may prevent the phenomenon of reaggregation after dispersing of pigment.

Specifically, under the condition that the first color and the third color are respectively red and green and the second color is blue, the main material of the filter layer 20 may comprise a blue photoresist composition. The main component of the blue photoresist composition comprises alkali-soluble resin, photoactive compound, photoinitiator, pigment dispersion and organic solvent. The pigment dispersion may comprise blue pigment, dispersant and organic solvent.

In the preparation of pigment dispersion, the blue pigment needs to be dissolved by organic solvent with dissolving effect. The organic solvent may be the same as the organic solvent selected in the blue photoresist composition, and the organic solvent may be different from the organic solvent selected in the blue photoresist composition.

For example, blue pigment uses organic pigment, for example selecting from at least one of C.I. Pigment Blue 15, C.I. Pigment Blue 15:1, C.I. Pigment Blue 15:2, C.I. Pigment Blue 15:3, C.I. Pigment Blue 15:4, C.I. Pigment Blue 15:6, C.I. Pigment Blue 16, C.I. Pigment Blue 22, C.I. Pigment Blue 60.

The dispersant may be selected from at least one of polyurethane, polyacrylate, unsaturated polyamide, ammonium polycarboxylate salt, polysiloxane and sodium lauryl sulfate.

It should be noted that the host material may also be other optical wave filter material with similar functions, which is not specifically limited here.

Figure 5:
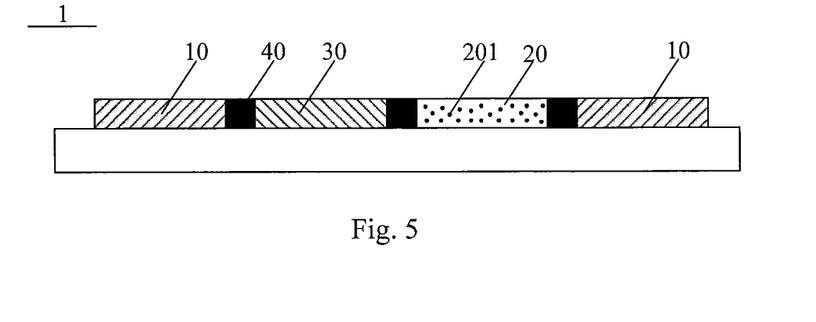
FIG. 5 is a schematic structural diagram of a display substrate according to an embodiment of the present disclosure.

Based on the above, as shown in FIG. 5, for example, the display substrate 1 further comprises a black matrix 40 located in an adjacent sub-pixel region. The black matrix 40, the first photoluminescent layer 10, the second photoluminescent layer 30, and the filter layer 20 are fabricated on the same display substrate, which can be fabricated on the same production line, thus saving time and cost.

Embodiments of the present disclosure further provide a display panel comprising the display substrate 1 described above. The display panel has the same technical effect as the display substrate 1 and is not described in detail herein.

Embodiments of the present disclosure further provide a display device, which comprises the display panel and the backlight module described above; which backlight module is used to emit light of the second color.

The backlight module may comprise a back plate, a light guide plate arranged on the back plate, an optical film arranged on the light exit side of the guide plate, and further may comprise a reflective sheet arranged between the light guide plate and the back plate. A light source may be arranged on the side of the light guide plate away from the light exit side, and may also be arranged on the side face of the light guide plate.

The display device may be any product with a display function such as a display, a mobile phone, a tablet computer, a notebook computer, a television, a digital photo frame, a navigator, etc.

Figure 6:
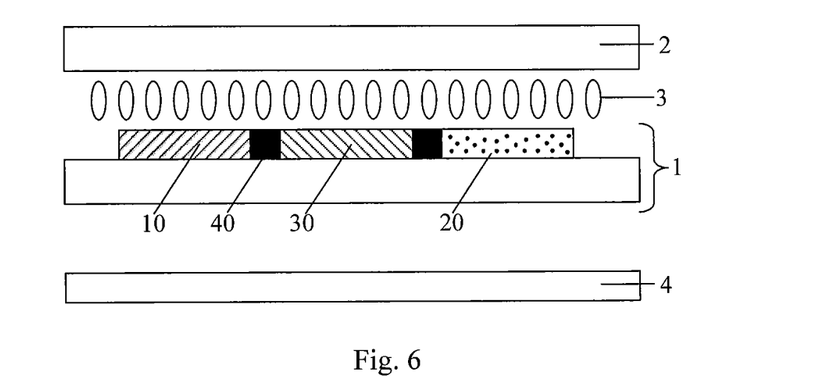
FIG. 6 is a schematic structural diagram of a display device according to an embodiment of the present disclosure.

Specifically, as shown in FIG. 6, the display panel comprises a display substrate 1 described above and a counter substrate 2, and a liquid crystal layer 3 is filled between the display substrate 1 and the counter substrate 2. The display substrate 1 further comprises thin-film transistors, transparent electrodes and the like which are arranged in each sub-pixel region. A backlight module 4 is arranged on one side of the display substrate 1.

Figure 7:
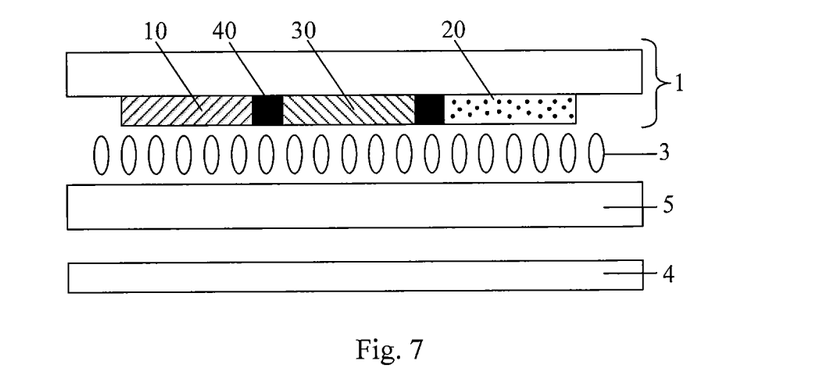
FIG. 7 is a schematic structural diagram of a display device according to an embodiment of the present disclosure.

As shown in FIG. 7, the display panel comprises the display substrate 1 described above and an array substrate 5, and a liquid crystal layer 3 is filled between the display substrate 1 and the array substrate 5. The array substrate 5 comprises thin-film transistors, transparent electrodes and the like which are arranged on a substrate. The backlight module 4 is arranged on one side of the array substrate 5.

Under the condition that the display panel comprises the display substrate 1 and the array substrate 5, the backlight module 4 can be sufficiently distant from the first photoluminescent layer 10, the second photoluminescent layer 30 and the filter layer 20, thereby making the utilization rate of the backlight higher.

Figure 8:
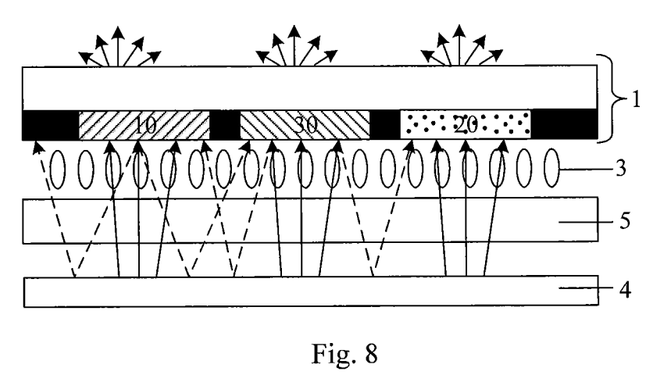
FIG. 8 is a diagram for illustrating optical path for a display device according to an embodiment of the present disclosure.

Under the condition that the display substrate 1 comprises the first photoluminescent layer 10 arranged in the first sub-pixel region, the second photoluminescent layer 30 arranged in the third sub-pixel region, and the filter layer 20 arranged in the second sub-pixel region, as shown in FIG. 8, the first photoluminescent layer 10 uniformly emits light of the first color around under excitation of light of the second color, and a part of light of the first color may be directed to the backlight module 4 and incident into the adjacent second sub-pixel region and the third sub-pixel region after being reflected again by the backlight module 4. However, due to the blocking effect of the second photoluminescent layer 30 of the third sub-pixel region, and the absorption and filtering effect of the filter layer 20 of the second sub-pixel region on light of a color other than the second color, the risk of color crosstalk in the second sub-pixel region and the third sub-pixel region is smaller, and the influence on the second sub-pixel and the third sub-pixel is smaller.

Similarly, the second photoluminescent layer 30 uniformly emits light of the third color around under excitation of light of the second color, and a part of light of the third color may be directed to the backlight module 4 and incident into the adjacent first sub-pixel region and the second sub-pixel region after being reflected again by the backlight module 4. However, due to the blocking effect of the first photoluminescent layer 10 of the first sub-pixel region, and the absorption and filtering effect of the filter layer 20 of the second sub-pixel region on light of a color other than the second color, the risk of color crosstalk in the first sub-pixel region and the second sub-pixel region is smaller, and the influence on the first sub-pixel and the second sub-pixel is smaller.

On this basis, when the filter layer 20 comprises a host material and a scattering material doped in the host material, the scattering material may scatter the light of the second color emitted by the backlight module 4 in all directions, so that the uniformity of the light emitted by the second sub-pixel at various angles may be increased.

Embodiments of the present disclosure provide a display device, by arranging a first photoluminescent layer 10 in a first sub-pixel region of display substrate 1, a second photoluminescent layer 30 in a third sub-pixel region, and a filter layer 20 in a second sub-pixel area, when a backlight module 4 emits light of the second color, the utilization rate and transmissivity of backlight may be remarkably increased by utilizing the self-luminous characteristics of the first photoluminescent layer 10 and the second photoluminescent layer 30 excited by the light of the second color and the characteristic that filter layer 20 is transmissive to substantially all of the light of the third color. On this basis, the problem of color crosstalk generated in each sub-pixel region may also be avoided.

Under the condition that the first color and the third color are respectively red and green, and the second color is blue, the backlight module 4 is a blue light backlight module, that is, the light source in the backlight module 4 is used to emit blue light.

Based on this, considering that the Light Emitting Diode (LED) has the advantages of high brightness, low heat, low energy consumption, long service life and the like, therefore, for example, the backlight module 4 adopts an LED emitting blue light as the light source.

Embodiments of the present disclosure further provide a method for fabricating the display substrate 1, with reference to FIG. 1, comprising: forming a first photoluminescent layer 10 in a first sub-pixel region of the substrate, which emits light of the first color under excitation of light of the second color; and forming a filter layer 20 in a second sub-pixel region of the substrate, which is used to filter out at least part of light of a color other than the second color.

Embodiments of the present disclosure provide a method for fabricating a display substrate 1, which has the same technical effect as the display substrate 1 and is not described in detail herein.

Figure 9:
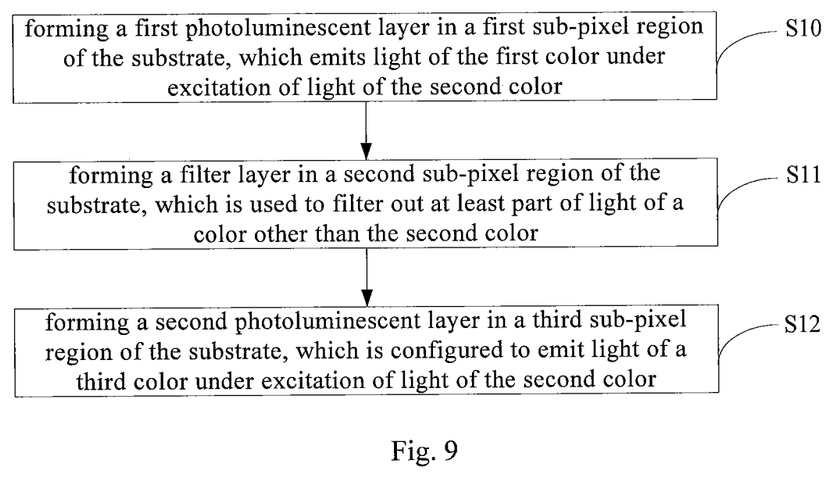
FIG. 9 is a flow chart for fabricating a display substrate according to an embodiment of the present disclosure.

For example, a method for fabricating a display substrate 1, as shown in FIG. 9, specifically comprises:

S10, as shown in FIGS. 2 and 4, forming a first photoluminescent layer 10 in a first sub-pixel region of the substrate, which emits light of the first color under excitation of light of the second color.

For example, a layer of a first photosensitive resin thin film mixed with fluorescent powder particles or quantum dots may be coated (e.g. spin-coated) on the substrate, and the fluorescent powder particles or quantum dots emit light of the first color under excitation of light of the second color. The first photosensitive resin thin film is exposed through a first mask plate to form an exposed region and an unexposed region. In the exposed region, the first photosensitive resin thin film is cured on the substrate, and the first photosensitive resin thin film in the unexposed region is etched away by a developer, so that a first photoluminescent layer 10 is formed in the first sub-pixel region.

S11, as shown in FIGS. 2 and 4, forming a filter layer 20 in a second sub-pixel region of the substrate, which is used to filter out at least part of light of a color other than the second color.

For example, a layer of second color filter thin film may be coated (e.g. spin-coated) on the substrate, and the second color filter thin film is exposed through a second mask plate to form an exposed region and an unexposed region. In the exposed region, the second color filter thin film is cured on the substrate, and the second color filter thin film in the unexposed region is etched away by a developer, so that a filter layer 20 is formed in the second sub-pixel region.

S12, as shown in FIGS. 2 and 4, forming a second photoluminescent layer 30 in a third sub-pixel region of the substrate, which is configured to emit light of a third color under excitation of light of the second color.

The second sub-pixel region is adjacent to the first sub-pixel region and the third sub-pixel region.

For example, a layer of a third photosensitive resin thin film mixed with fluorescent powder particles or quantum dots may be coated (e.g. spin-coated) on the substrate, and the fluorescent powder particles or quantum dots emit light of the third color under excitation of light of the second color. The third photosensitive resin thin film is exposed through a third mask plate to form an exposed region and an unexposed region. In the exposed region, the third photosensitive resin thin film is cured on the substrate, and the third photosensitive resin thin film in the unexposed region is etched away by a developer, so that a second photoluminescent layer 30 is formed in the third sub-pixel region.

It should be noted that the sequence in which S10, S11 and S12 are performed is not limited to the above embodiment.

For example, the first photoluminescent layer 10, the second photoluminescent layer 30, and the filter layer 20 are formed by using a same mask plate so that the process may be simplified and the cost may be saved.

Namely, the first mask plate, the second mask plate and the third mask plate are a same mask plate.

For example, as shown in FIG. 5, the fabricating method further comprises forming a black matrix 40.

For example, a black matrix thin film may be formed on the substrate, and the black matrix thin film is exposed through a black matrix mask plate, thereby forming a black matrix 40 on the substrate.

The black matrix 40 may be formed before forming the first photoluminescent layer 10, the second photoluminescent layer 30 and the filter layer 20, and may also be formed after forming the first photoluminescent layer 10, the second photoluminescent layer 30 and the filter layer 20.

Embodiments of the present disclosure provide a display substrate and a method for fabricating the same, a display panel and a display device. By arranging a first photoluminescent layer in a first sub-pixel region of the display substrate, and a filter layer in a the second sub-pixel region, when the backlight module emits light of the second color, the utilization rate and transmissivity of backlight may be remarkably increased by utilizing the self-luminous characteristic of the first photoluminescent layer excited by the light of the second color and the characteristic that the filter layer absorbs little light of the second color and is transmissive to substantially all of the light of the second color. On this basis, based on the absorption and filtering effect of the filter layer on light of the non-second color, even if the first photoluminescent layer uniformly emits light of the first color around under excitation of light of the second color, a part of light of the first color may be directed to the backlight module, and incident into the second sub-pixel region after being reflected again by the backlight module, the reflected light of the first color would not cause color crosstalk in the second sub-pixel region.

The above descriptions are only specific embodiments of the present disclosure, but the protection scope of the present disclosure is not limited thereto. Any variations or substitutions that may be easily contemplated by those skilled in the art within the scope of the technology disclosed herein shall be covered by the protection scope of the present disclosure. Therefore, the protection scope of the present disclosure shall be subject to the protection scope of the claims.

What is claimed is:

1. A display substrate, comprising:
    a first photoluminescent layer which is in a first sub-pixel region and configured to emit light of a first color under excitation of light of a second color; and
    a filter layer which is in a second sub-pixel region and configured to filter at least part of light of a different color other than the second color,
    a second photoluminescent layer which is in a third sub-pixel region and is configured to emit light of a third color under excitation of the light of the second color,
    wherein the second sub-pixel region is adjacent to both the first sub-pixel region and the third sub-pixel region.

2. The display substrate of claim 1,
    wherein one of the first color or the third color is red,
    wherein another one of the first color and the third color is green, and
    wherein the second color is blue.

3. The display substrate of claim 1, wherein the first photoluminescent layer and the second photoluminescent layer comprise quantum dots or fluorescent powder.

4. The display substrate of claim 1, wherein the filter layer comprises a host material and a scattering material doped in the host material.

5. The display substrate of claim 4, wherein the scattering material comprises at least one of $SiO_2$, $TiO_2$, $CaCO_3$ or a polymer.

6. The display substrate of claim 4, wherein the scattering material in the filter layer has a mass percentage between 0.2% and 10%.

7. The display substrate of claim 6, wherein the scattering material in the filter layer has a mass percentage between 0.2% and 2%.

8. The display substrate of claim 4, wherein the host material comprises a photoresist composition.

9. The display substrate of claim 8,
wherein the photoresist composition comprises a dispersant, and
wherein the dispersant comprises at least one of polyurethane, polyacrylate, unsaturated polyamide, ammonium polycarboxylate salt, polysiloxane or sodium lauryl sulfate.

10. A display panel, comprising the display substrate of claim 1.

11. A display device, comprising the display panel of claim 10, and a backlight module configured to emit light of the second color.

12. A method for fabricating a display substrate, comprising:
forming a first photoluminescent layer in a first sub-pixel region of a substrate, wherein the first photoluminescent layer is configured to emit light of a first color under excitation of light of a second color;
forming a filter layer in a second sub-pixel region of the substrate, wherein the filter layer is configured to filter at least part of light of a different color other than the second color; and
forming a second photoluminescent layer in a third sub-pixel region of the substrate,
wherein the second photoluminescent layer is configured to emit light of a third color under excitation of the light of the second color, and
wherein the second sub-pixel region is adjacent to both the first sub-pixel region and the third sub-pixel region.

13. The method of claim 12, wherein the first photoluminescent layer, the filter layer and the second photoluminescent layer are formed by using a same mask.

* * * * *